US012601146B2

(12) United States Patent
Hiraoka et al.

(10) Patent No.: US 12,601,146 B2
(45) Date of Patent: Apr. 14, 2026

(54) WORK MACHINE

(71) Applicant: KOBELCO CONSTRUCTION MACHINERY CO., LTD., Hiroshima (JP)

(72) Inventors: Kei Hiraoka, Hiroshima (JP); Yuichiro Fujita, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 1177 days.

(21) Appl. No.: 17/614,152

(22) PCT Filed: Apr. 21, 2020

(86) PCT No.: PCT/JP2020/017256
§ 371 (c)(1),
(2) Date: Nov. 24, 2021

(87) PCT Pub. No.: WO2020/250573
PCT Pub. Date: Dec. 17, 2020

(65) Prior Publication Data

US 2022/0213667 A1 Jul. 7, 2022

(30) Foreign Application Priority Data

Jun. 10, 2019 (JP) ................................ 2019-108012

(51) Int. Cl.
*E02F 9/20* (2006.01)
*E02F 3/32* (2006.01)
(Continued)

(52) U.S. Cl.
CPC .............. *E02F 9/2037* (2013.01); *E02F 3/32* (2013.01); *E02F 3/425* (2013.01); *E02F 3/435* (2013.01);
(Continued)

(58) Field of Classification Search
CPC . E02F 9/2037; E02F 3/32; E02F 3/425; E02F 3/435; E02F 9/123; E02F 9/2004;
(Continued)

(56) References Cited

U.S. PATENT DOCUMENTS 7,841,175 B2 * 11/2010 Koo ...................... E02F 9/2282 60/486
9,145,660 B2 * 9/2015 Peterson ............. F15B 11/0423
(Continued)

FOREIGN PATENT DOCUMENTS

EP 1 512 798 A1 3/2005
EP 2 653 619 A1 10/2013
(Continued)

OTHER PUBLICATIONS

International Search Report mailed on Jul. 14, 2020 in PCT/JP2020/017256 filed on Apr. 21, 2020 (2 pages).
(Continued)

*Primary Examiner* — Christopher George Fees
(74) *Attorney, Agent, or Firm* — Oblon, McClelland, Maier & Neustadt, L.L.P.

(57) ABSTRACT

A work machine includes first and second work actuator control valves, a work command adjuster that changes a work command to be input to the second work actuator control valve in accordance with a work adjustment command, and a controller including an adjustment command part that inputs the work adjustment command to the work command adjuster. The adjustment command part performs an asynchronization control in a single work operation state and a synchronization control in a combination operation state including a turning deceleration operation and a work operation. For the synchronization control, the adjustment command part generates the work adjustment command to render a minimum work operation amount to open the first
(Continued)

work actuator control valve equal to a minimum work operation amount to close the second work actuator control valve and inputs it to the work command adjuster.

5 Claims, 7 Drawing Sheets

(51) Int. Cl.

| | |
|---|---|
| ***E02F 3/42*** | (2006.01) |
| ***E02F 3/43*** | (2006.01) |
| ***E02F 9/12*** | (2006.01) |
| ***E02F 9/22*** | (2006.01) |
| ***F15B 11/17*** | (2006.01) |
| ***F15B 15/18*** | (2006.01) |

(52) U.S. Cl.
CPC ............ *E02F 9/123* (2013.01); *E02F 9/2004* (2013.01); *E02F 9/2228* (2013.01); *E02F 9/2285* (2013.01); *E02F 9/2292* (2013.01); *F15B 11/17* (2013.01); *F15B 15/18* (2013.01); *E02F 9/2267* (2013.01); *E02F 9/2271* (2013.01)

(58) Field of Classification Search
CPC ..... E02F 9/2228; E02F 9/2285; E02F 9/2292; E02F 9/2267; E02F 9/2271; F15B 11/17; F15B 15/18
See application file for complete search history.

(56) References Cited

U.S. PATENT DOCUMENTS

| | | | | |
|---|---|---|---|---|
| 10,233,614 | B2 * | 3/2019 | Isogai | F16K 27/003 |
| 2001/0054286 | A1 * | 12/2001 | Tohji | E02F 9/2296 60/486 |
| 2005/0060993 | A1 * | 3/2005 | Oka | E02F 9/2296 60/325 |
| 2006/0265915 | A1 * | 11/2006 | Toji | E02F 9/2296 37/348 |
| 2012/0198831 | A1 * | 8/2012 | Kodaka | E02F 9/2292 60/422 |
| 2013/0332036 | A1 | 12/2013 | Yamamoto et al. | |
| 2014/0020370 | A1 * | 1/2014 | Berg | E02F 9/2253 60/327 |
| 2016/0251833 | A1 | 9/2016 | Kondo et al. | |
| 2017/0107697 | A1 * | 4/2017 | Kawashima | E02F 9/2228 |
| 2017/0241105 | A1 * | 8/2017 | Yuzawa | F15B 11/08 |
| 2018/0058042 | A1 * | 3/2018 | Moriki | E02F 9/2235 |
| 2020/0277755 | A1 * | 9/2020 | Kondo | F15B 1/024 |

FOREIGN PATENT DOCUMENTS

| | | | |
|---|---|---|---|
| EP | 3 165 683 | A1 | 5/2017 |
| JP | 2005-83427 | A | 3/2005 |
| JP | 2019-27261 | A | 2/2019 |
| WO | WO 2019/054365 | A1 | 3/2019 |

OTHER PUBLICATIONS

Extended European Search Report issued May 17, 2022 in European Patent Application No. 20823290.0, 7 pages.

* cited by examiner

WORK MACHINE

TECHNICAL FIELD

The present invention relates to a work machine including a turning motor and a work actuator.

BACKGROUND ART

For example, in Patent Document 1 is described a conventional work machine. The work machine includes a first pump, a second pump, a boom cylinder as a work actuator, a turning motor, and two boom control valves, namely, a boom direction selector valve and a boom merging valve.

The boom direction selector valve is opened by an input of a pilot pressure to the boom selector valve when a boom raising operation for causing a boom of the work machine to make a boom rising motion or a boom lowering operation for causing the boom to make a boom falling motion is performed, thereby allowing hydraulic fluid discharged from the first pump to be supplied to the boom cylinder through the boom direction selector valve. The hydraulic fluid discharged from the second pump is supplied to the turning motor. The boom merging valve is opened by an input of a pilot pressure together with the boom direction selector valve when the boom raising operation is performed, thereby allowing the hydraulic fluid discharged from the second pump to be supplied to the work actuator through the boom merging valve, that is, allowing the hydraulic fluid discharged from the second hydraulic pump to be merged with the hydraulic fluid discharged from the first pump to be supplied to the boom cylinder.

The hydraulic fluid which is allowed to merge by the boom merging valve, that is, which is supplied from the second pump to the boom cylinder, is one for increasing the speed of the boom raising motion when the boom raising operation is large, that is, when the required boom raising speed is large; therefore, a difference is typically provided between the valve opening characteristic of the boom merging valve and the valve opening characteristic of the boom direction control valve so as to cause the boom merging valve to be opened only when the boom raising operation is large. Specifically, respective valve opening characteristics of both the valves are set so as to cause the boom merging valve to start to be opened by a pilot pressure larger than the pilot pressure required for opening the boom direction control valve.

Giving the difference between the valve opening characteristic of the boom direction selector valve and the boom merging valve and the valve opening characteristic of the boom merging valve, however, may cause the rotation speed of the turning motor to be increased when a combination operation state where a turning operation for moving the turning motor and a work operation for moving the work actuator such as the boom raising operation are simultaneously performed is shifted to a single turning operation state where only the turning operation is performed. Specifically, the boom merging valve is closed prior to the boom direction selector valve before the operation amount of the work operation becomes zero (for example, before an operation lever for work operation is returned to a lever neutral position) during the reduction in the operation amount of the work operation in the combination operation state (for example, the operation lever is returned), thereby causing the hydraulic fluid flowing that had flown from the second pump to the work actuator to flow to the turning motor to rapidly increase the flow rate of the hydraulic fluid supplied to the turning motor, which may increase the angular acceleration of the turning motor at unexpected timing for an operator. Especially, in the case where the turning operation is a turning deceleration operation for decelerating the turning motor, the rapid increase in the speed of the turning motor is contrary to the intention of the operator.

Such a problem can be caused by the shift to the single turning operation state from not only the combination operation state including the boom raising operation and the turning operation but also a combination operation state where a work operation for causing a work attachment to make a specific work motion and a turning operation are simultaneously performed.

CITATION LIST

Patent Literature

Patent Literature 1: Japanese Unexamined Patent Publication No. 2005-83427

SUMMARY OF INVENTION

It is an object of the present invention to provide a work machine including a turning motor and a work actuator, the work machine being capable of driving the work actuator at a high speed when a work operation for operating the work actuator is large and further capable of restraining the speed of the turning motor from being increased at unexpected timing for an operator when the work operation is reduced from a combination operation state where the work operation and a turning operation for moving the turning motor are simultaneously performed.

Provided is a work machine including: a lower traveling body; an upper turning body mounted on the lower traveling body so as to be turnable; a work attachment mounted on the upper turning body; a work actuator that is driven, by supply of hydraulic fluid to the work actuator, to cause the work attachment to make a specific work motion; a turning motor that is driven, by supply of hydraulic fluid to the turning motor, to cause the upper turning body to make a turning motion; a first pump that discharges hydraulic fluid; a second pump that discharges hydraulic fluid separately from the first pump; a work operation part that is operated, by a work operation applied to the work operation part for causing the work attachment to make a specific work motion, to output a work command corresponding to a work operation amount that is a magnitude of the work operation; a turning operation part that is operated, by a turning operation applied to the turning operation part for causing the upper turning body to make a specific turning motion, to output a turning command corresponding to the turning operation; a first work actuator control valve provided between the first pump and the work actuator and connected to the work operation part to be opened and closed by input of the work command to the first work actuator control valve so as to change a flow rate of hydraulic fluid supplied from the first pump to the work actuator in accordance with the work command; a second work actuator control valve provided between the second pump and the work actuator and connected to the work operation part to be opened and closed by input of the work command to the second work actuator control valve so as to change a flow rate of hydraulic fluid supplied from the second pump to the work actuator in accordance with the work command; a turning control valve provided between the second pump and the turning motor and connected to the turning operation part to be opened and closed by input of the turning command to the turning control valve so as to change a flow rate of hydraulic fluid supplied from the second pump to the turning motor; a work command adjuster that is operated, by input of a work adjustment command to the work command adjuster, to change a magnitude of the work command to be input from the work operation part to the second work actuator control valve in accordance with the work adjustment command; and a controller. The controller includes an adjustment command part that generates the work adjustment command and inputs the work adjustment command to the work command adjuster. The adjustment command part is configured to perform an asynchronization control of generating the work adjustment command to render a second minimum operation amount with respect to the work operation amount greater than a first minimum operation amount and to input the work adjustment command to the work command adjuster in a single work operation state where the work operation is applied to the work operation part whereas the turning operation is not applied to the turning operation part, and configured to perform a synchronization control of generating the work adjustment command to render the second minimum operation amount equal to the first minimum operation amount and to input the work adjustment command to the work command adjuster at least when the turning operation is a turning deceleration operation for decelerating the turning motion in a combination operation state where the work operation is applied to the work operation part and simultaneously the turning operation is applied to the turning operation part. The first minimum operation amount is the minimum operation amount of the work operation amount to allow the first work actuator control valve to be opened from a valve closed state, and the second minimum operation amount is the minimum amount of the work operation amount to allow the second work actuator control valve to be opened. Hence, the asynchronization control is a control for rendering the timing at which the second work actuator control valve is switched from the valve closed state to a valve opened state later than the timing at which the first work actuator control valve is opened (i.e., for advancing the timing at which the valve is switched from the open state to the closed state), and the synchronization control is a control for rendering respective timings when the first and second work actuator control valves are switched between the open state and the closed valve state equal to each other.

DESCRIPTION OF EMBODIMENTS

Figure 1:
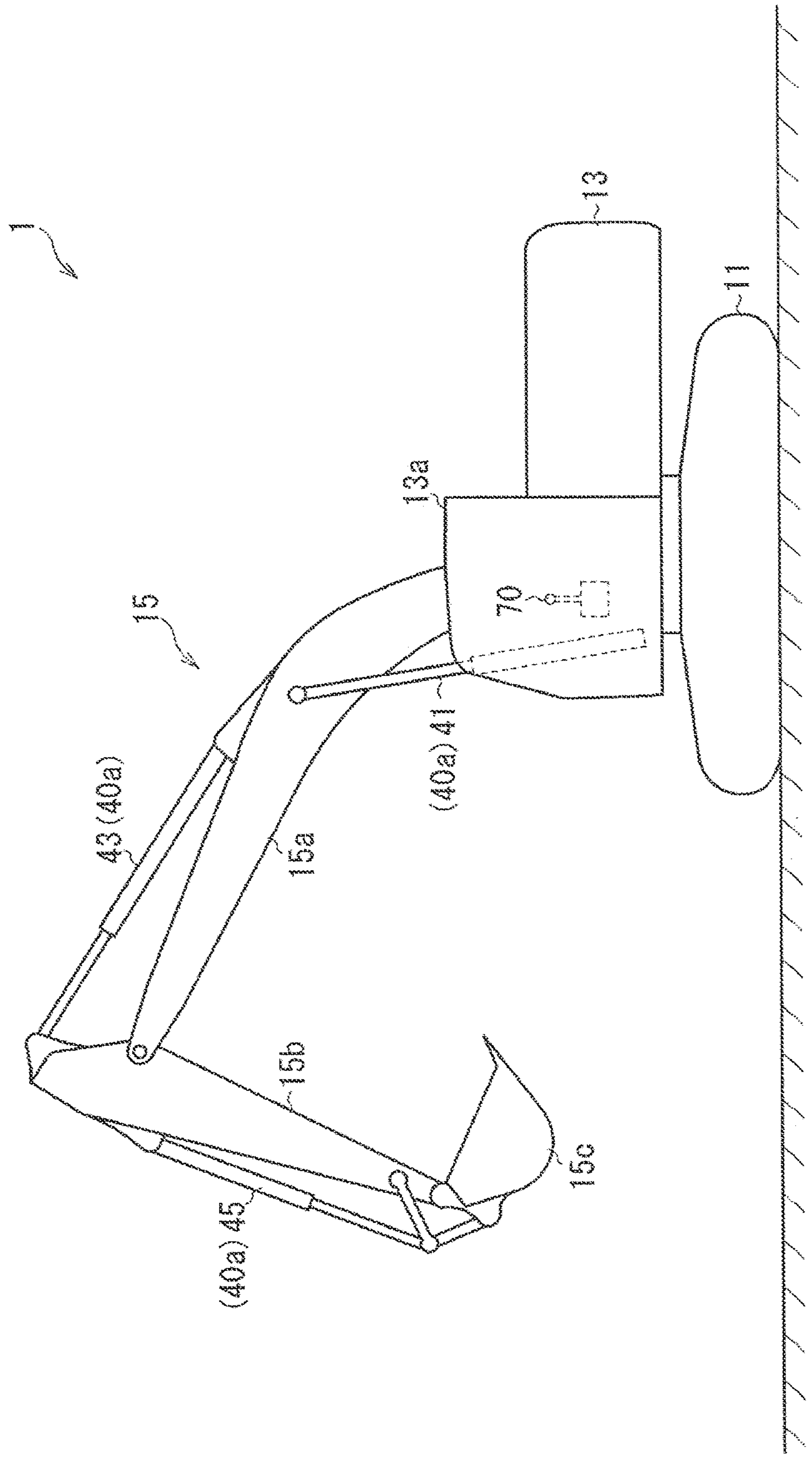
FIG. 1 is a side view of a work machine according to an embodiment of the present invention.

Referring to FIGS. 1 to 7, there will be described a work machine 1 according to an embodiment of the present invention.

The work machine 1 is a machine for performing specific work. The work machine 1 is, for example, a construction machine for performing construction work, which may be either an excavator or a crane. The work machine 1 includes a lower traveling body 11, an upper turning body 13, a work attachment device 15 and a hydraulic control device 20 shown in FIG. 2.

The lower traveling body 11 makes a traveling motion. The upper turning body 13 is mounted on the lower traveling body 11 so as to be turnable. The upper turning body 13 includes an operation chamber **13*a* allowing an operator to perform the operation of the work machine 1**.

The work attachment device 15 is a device that makes a work motion, thus being a work device. The work attachment device 15 is mounted on the upper turning body 13. The work attachment device 15 includes a plurality of attachment elements, namely, a boom **15*a*, an arm 15*b* and a bucket 15*c*. The boom 15*a* is attached to the upper turning body 13 so as to be raisable and lowerable (that is, vertically rotationally movable). The arm 15*b* is attached to the boom 15*a* so as to be movable vertically rotationally. The bucket 15*c* is attached to the arm 15*b*** so as to be movable vertically rotationally.

Figure 2:
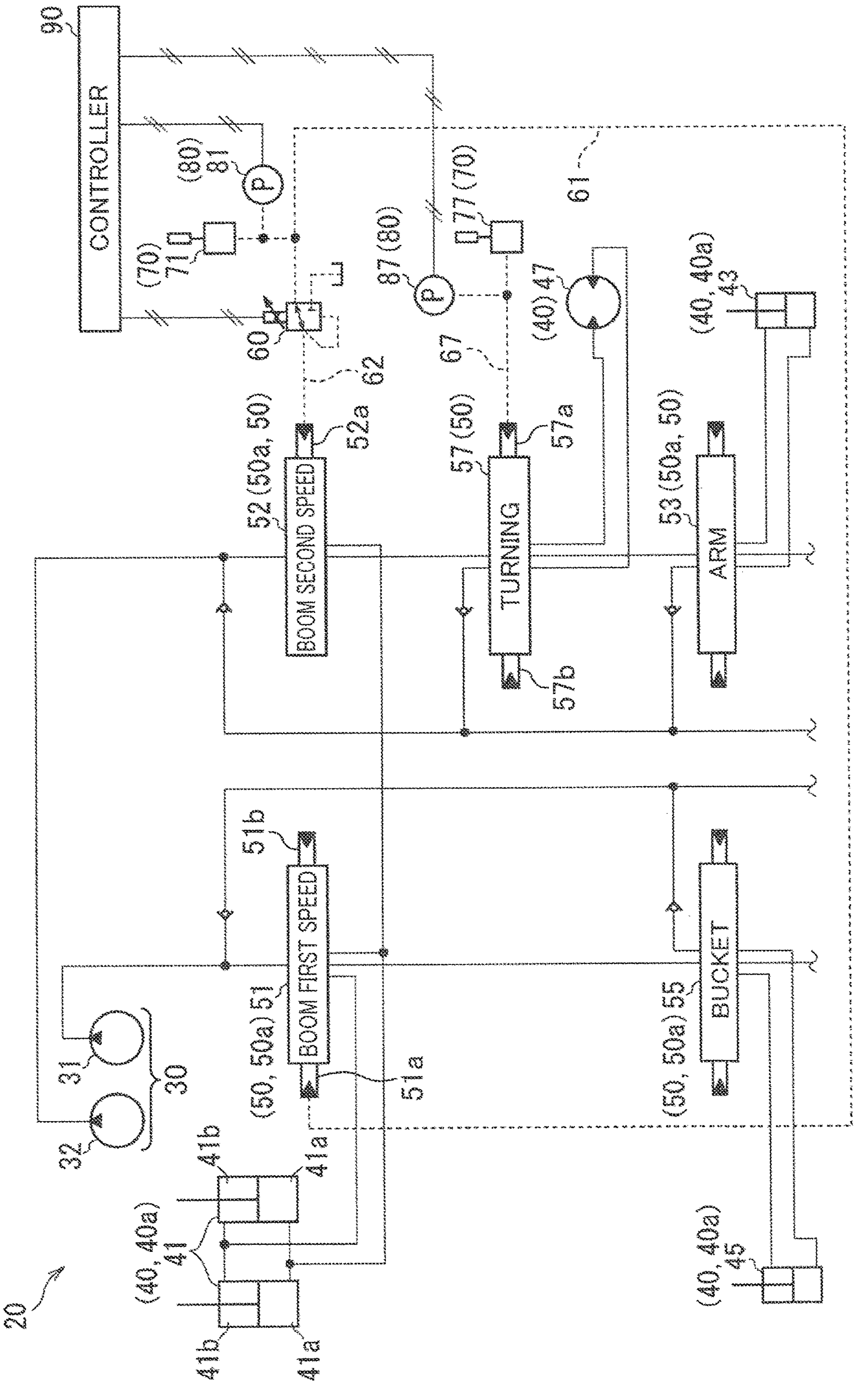
FIG. 2 is a diagram showing a hydraulic circuit mounted on the work machine.

The hydraulic control device 20 is a device that performs hydraulic control of the operation of the work machine 1, including a hydraulic circuit shown in FIG. 2. The hydraulic control device 20 includes: a hydraulic fluid supply unit 30; a plurality of actuators 40; a plurality of control valves 50; a plurality of operation parts 70; a pilot pressure limiting valve 60; a plurality of operation amount detectors 80; and a controller 90.

The hydraulic fluid supply unit 30 includes a plurality of hydraulic pumps, each of which discharges hydraulic fluid. The plurality of hydraulic pumps are connected to a not-graphically-shown engine, which is a drive source, to be driven by power output from the engine to thereby discharge hydraulic fluid. The plurality of hydraulic pumps include a first pump 31 and a second pump 32 that discharges hydraulic fluid separately from the first pump 31. The first pump 31 is capable of supplying hydraulic fluid to each of a pair of boom cylinders 41 included in the plurality of work actuators 40. The second pump 32 is capable of supplying hydraulic fluid to the pair of boom cylinders 41 and a turning motor 47 included in the plurality of actuators 40. The second pump 32 is capable of supplying hydraulic fluid to the pair of boom cylinders 41 and the turning motor 47 simultaneously and concurrently.

Each of the plurality of actuators 40 is disposed to actuate the work machine 1. Each of the plurality of actuators 40 is a hydraulic actuator that is driven by supply of hydraulic fluid thereto. The plurality of actuators 40 include a plurality of work actuators **40*a* and the turning motor 47**.

The plurality of work actuators **40*a* are disposed to actuate the work attachment device 15. The plurality of work actuators 40*a* include a plurality of expandable hydraulic cylinders, namely, a pair of boom cylinders 41, an arm cylinder 43 and a bucket cylinder 45**.

The pair of boom cylinders 41 are disposed to cause the boom **15*a* to make rising and falling motions (that is, to make vertically rotational motion) to the upper turning body 13 shown in FIG. 1. The number of boom cylinders 41 is not limited. This is similar to the arm cylinder 43 and the bucket cylinder 45. As shown in FIG. 2, the boom cylinder 41 includes a head chamber 41***a* and a rod chamber 41*b*. By supply of hydraulic fluid to the head chamber 41*a*, the boom cylinder 41 is driven in an expansion direction, while discharging hydraulic fluid from the rod chamber 41*b*, to move the boom 15*a* rotationally upward, that is, to cause the boom 15*a* to make a boom rising motion. In contrast, by supply of hydraulic fluid to the rod chamber 41*b*, the boom cylinder 41 is driven in a contraction direction, while discharging hydraulic fluid from the head chamber 41*a*, to move the boom 15*a* rotationally downward, that is, to cause the boom 15*a* to make a boom falling motion.

The arm cylinder 43 is disposed to move the arm 15*b* rotationally vertically to the boom 15*a*. The bucket cylinder 45 is disposed to move the bucket 15*c* rotationally vertically to the arm 15*b*. Each of the arm cylinder 43 and the bucket cylinder 45 includes a head chamber and a rod chamber similar to the head chamber 41*a* and the rod chamber 41*b* of the boom cylinder 41, being expandable and contractable similarly to the boom cylinder 41.

In this embodiment, each of the pair of boom cylinders 41 of the plurality of work actuators is an example of a "work actuator" according to the present invention, and the boom rising motion corresponds to a "specific work motion". The "work actuator" and the "specific work motion" which the work actuator cause the work attachment to make are not limited to the boom cylinder 41 and the boom rising motion, respectively.

The turning motor 47 is connected to the upper turning body 13 so as to cause the upper turning body 13 to make a turning motion to the lower traveling body 11. As shown in FIG. 2, the turning motor 47 is a hydraulic motor, which is driven by supply of hydraulic fluid to the turning motor 47*a* discharged from the second pump 32 to thereby cause the upper turning body 13 to make the turning operation.

The plurality of control valves 50 are provided between the hydraulic fluid supply unit 30 and the plurality of actuators 40 (in the middle of respective fluid paths connecting the hydraulic fluid supply unit 30 and the plurality of actuators 40), respectively. Each of the plurality of control valves 50 is opened and closed so as to change the flow direction and the flow rate of hydraulic fluid supplied to the actuator 40 corresponding to the control valve 50 out of the plurality of actuators 40 discharged from the hydraulic fluid supply unit 30. The plurality of control valves 50 include a plurality of work actuator control valves 50*a* and a turning control valve 57.

The plurality of work actuator control valves 50*a* are provided between the hydraulic fluid supply unit 30 and the plurality of work actuators 40*a*, and opened and closed so as to control the flow direction and flow rate of the hydraulic fluid supplied to the plurality of work actuators 40 from the hydraulic fluid supply unit 30. The plurality of work actuator control valves 50*a* include a first boom control valve 51, a second boom control valve 52 an arm control valve 53, and a bucket control valve 55.

The first boom control valve 51 is an example of a "first work actuator control valve". The first boom control valve 51 is also referred to as a "boom 1st speed valve" or a "boom main spool valve". The first boom control valve 51 is provided between the first pump 31 and the pair of boom cylinders 41, and configured to be opened and closed so as to change the flow direction and the flow rate of hydraulic fluid supplied from the first pump 31 to the pair of boom cylinders 41. Specifically, the first boom control valve 51 can be opened and closed by input of a boom raising command, which is an example of a work command, so as to change the flow rate of hydraulic fluid to be supplied to the pair of boom cylinders 41 (more particularly, the respective head chambers 41*a* thereof) from the first pump 31 into a flow rate corresponding to the work command. The "boom raising command" is a command for causing the boom 15*a* to make the boom rising motion, in other words, a command for expanding the boom cylinder 41.

Specifically, the first boom control valve 51 is opened so as to form a flow path that allows hydraulic fluid to be supplied from the first pump 31 to the head chamber 41*a*, and opened and closed so as to change the opening degree of the opening of the flow path. The first boom control valve 51 is a spool valve including a spool and changing the opening degree of the opening, specifically, a boom-raising meter-in opening, by the change in the position of the spool. The first boom control valve 51 is a pilot-operated hydraulic selector valve having a boom raising pilot port 51*a* and a boom lowering pilot port 51*b*, wherein the spool is displaced, by input of a pilot pressure to any of the pilot ports 51*a* and 51*b*, in a direction corresponding to the pilot port to which the pilot pressure is input and by a stroke corresponding to the magnitude of the pilot pressure. Each the control valves 50 other than the first boom control valve 51 out of the plurality of control valves 50 is also composed of the same spool valve.

The boom raising command, in this embodiment, is a boom raising pilot pressure which is a pilot pressure to be input to the pilot port of the first boom control valve 51, and the first boom control valve 51 is opened so as to cause each of the pair of boom cylinders 41 to be expanded (that is, cause the boom 15*a* to make a boom rising motion) in accordance with the input of the boom raising pilot pressure, at an opening degree corresponding to the magnitude of the boom raising pilot pressure. The first boom control valve 51, alternatively, may be operated in accordance with an electric signal that is input to the first boom control valve 51. In short, the work command exemplified by the boom raising command may be an electric signal or the like. The first boom control valve 51, conversely, can be opened and closed by the input of the boom lowering command, which is a command for lowering the boom 15*a*, to the first boom control valve 51 so as to change the flow rate of hydraulic fluid to be supplied from the first pump 31 to the rod chamber 41*b* of the boom cylinder 41 into a flow rate corresponding to the boom lowering command.

The second boom control valve 52 is an example of a second work actuator control valve. The second boom control valve 52 is also referred to as a "boom 2nd speed valve" or a "boom raising merging valve". The second boom control valve 52 is provided between the second pump 32 and the boom cylinder 41, and configured to be opened and closed so as to change the flow rate of hydraulic fluid to be supplied from the second pump 32 to the boom cylinder 41. The second boom control valve 52 is opened so as to allow hydraulic fluid to be supplied from the second pump 32 to the head chamber 41*a* of the boom cylinder 41 to increase the speed of the boom raising motion of the boom 15*a*. Thus, the second boom control valve 52 is a valve that is opened so as to allow hydraulic fluid discharged from the second pump 32 to be merged with hydraulic fluid discharged from the first pump 31 to be supplied to the head chamber 41*a*.

The second boom control valve 52 can be opened and closed, by input of the boom raising command to the second boom control valve 52, so as to change the flow rate of hydraulic fluid to be supplied from the second pump 32 to the boom cylinder 41 (specifically, the head chamber 41*a*) into a flow rate corresponding to the boom raising pilot pressure. Specifically, the second boom control valve 52 is opened so as to form a flow path that allows hydraulic fluid to be supplied to the head chamber 41*a* of the boom cylinder 41, and operated so as to change the opening degree of the flow path, namely, the area of the boom raising/merging meter-in opening. The second boom control valve 52 does not have to be operated when the boom 15*a* is lowered. In other words, no flow path is required to be formed for supplying hydraulic fluid from the second boom control valve 52 to the rod chamber 41*b*. However, a flow path may be provided for supplying hydraulic fluid from the second boom control valve 52 to the rod chamber 41*b*. For example, the second boom control valve 52 may be operated, by the input of the boom lowering command, to form a flow path that allows hydraulic fluid discharged from the second pump 32 to be supplied not to the head chamber 41*a* but to the rod chamber 41*b*.

The second boom control valve 52 according to this embodiment is a pilot operated hydraulic selector valve having a boom raising pilot port 52*a*, and the boom raising command to be input to the second boom control valve 52 is a boom raising pilot pressure to be input to the boom raising pilot port 52*a*. The second boom control valve 52 is opened by the input of the boom raising pilot pressure thereto at an opening degree corresponding to the boom raising pilot pressure. To the second boom control valve 52 may be input an electric signal as the boom raising command (work command).

The arm control valve 53 is opened and closed so as to change the flow direction and the flow rate of hydraulic fluid discharged from the second pump 32 of the hydraulic fluid supply unit 30 to be supplied to the arm cylinder 43. The arm control valve 53 may be provided for each of the first pump 31 and the second pump 32 in the same manner as the first boom control valve 51 and the second boom control valve 52.

The bucket control valve 55 is opened and closed so as to change the flow direction and the flow rate of hydraulic fluid supplied from the first pump 31 of the hydraulic fluid supply unit 30 to the bucket cylinder 45. The bucket control valve 54 may be provided for each of the first pump 31 and the second pump 32 in the same manner as the first boom control valve 51 and the second boom control valve 52.

The turning control valve 57 is provided between the second pump 32 and the turning motor 47, and configured to be opened and closed so as to change the flow direction and the flow rate of hydraulic fluid supplied from the second pump 32 to the turning motor 47. More specifically, the turning control valve 57 is opened so as to allow hydraulic fluid to be supplied to the boom cylinder 41 from the hydraulic pump that is a pump to supply hydraulic fluid to the boom cylinder 41 via the second boom control valve 52 out of hydraulic pumps included in the hydraulic fluid supply unit 30, namely, the second pump 32. The turning control valve 57 and the second boom control valve 52 are connected, in parallel, to the second pump 32. The turning control valve 57 can be opened and closed, by the input of the turning command to the turning control valve 57, so as to change the flow rate of hydraulic fluid to be supplied from the second pump 32 to the turning motor 47 into a flow rate corresponding to the turning command. The "turning command" is a command for causing the upper turning body 13 to make a turning motion, that is, a command for operating the turning motor 47.

The turning control valve 57 according to this embodiment is a pilot operated hydraulic selector valve having a pair of turning pilot ports 57*a* and 57*b*, and the turning command is a pilot pressure that is input to any of the pair of turning pilot ports 57*a* and 57*b*, namely, a turning pilot pressure, in this embodiment. The turning command, alternatively, may be an electrical signal.

To each of the plurality of operation parts 70 is applied an operation for moving the work machine 1 by an operator. The plurality of operation parts 70 may be provided either in the operation chamber 13*a* or at a position away from the operation chamber 13*a*. For example, remote control of the work machine 1 may be performed. Each of the plurality of operation parts 70 outputs a command having a command value corresponding to an operation amount which is the magnitude of the operation applied to the operation part 70. The operation part 70 illustrated in FIG. 2 includes a remote control valve, which includes an operation lever that allows an operation to be applied thereto and outputs a pilot pressure having a magnitude corresponding to an operation amount which is the magnitude of the operation. The operation part 70, alternatively, may output an electric signal corresponding to the operation. The operation part 70 outputs a command having a larger command value as the operation amount is larger.

The plurality of operation parts 70 include a boom operation part 71 and a turning operation part 77.

To the boom operation part 71 are applied a boom raising operation and a boom lowering operation. The boom operation part 71 is an example of a work operation part, and the boom raising operation is an example of a work operation. The boom raising operation is an operation for causing the boom 15*a* to make the boom rising motion, and specifically, the boom raising operation is an operation for expanding each of the pair of boom cylinders 41. The boom lowering operation is an operation for causing the boom 15*a* to make a falling motion to the boom 15*a*, and specifically, the boom lowering operation is an operation for contracting the pair of boom cylinders 41.

The boom operation part 71 outputs a boom raising pilot pressure which is a boom raising command corresponding to the boom raising operation when the boom raising operation is applied to the boom operation part 71, and outputs a boom lowering pilot pressure which is a boom lowering command corresponding to the boom lowering operation when the boom lowering operation is applied. The boom operation part 71 is connected to the boom raising pilot port 51*a* and the boom lowering pilot port 51*b* of the first boom control valve 51 via a first boom raising pilot line 61 and a not-graphically-shown boom lowering pilot line, and connected to the boom raising pilot port 52*a* of the second boom control valve 52 via a second boom raising pilot line 62. The boom operation part 71, thus, can input the boom raising pilot pressure to the boom raising pilot port 51*a* of the first boom control valve 51 and the boom raising pilot port 52*a* of the second boom control valve 52 through the first and second boom raising pilot lines 61 and 62, respectively. When the second boom control valve 52 is controlled in accordance with the electric signal, the boom operation part 71 may output a boom raising command corresponding to the boom raising operation that is applied to the boom operation part 71 via the controller 90 (also for the first boom control valve 51).

The boom operation part 71 according to this embodiment outputs a boom raising pilot pressure which is a pilot pressure corresponding to the boom raising operation applied to the boom operation part 71. The boom raising pilot pressure which is thus output is directly input to the boom raising pilot port 51*a* of the first boom control valve 51 through the first boom raising pilot line 61 and input to the boom raising pilot port 52*a* of the second boom control valve 52 through a second boom raising pilot line 62 in the middle of which the pilot pressure limiting valve 60 is provided as described later. The boom raising operation in this embodiment is an operation of tilting an operation lever, which constitutes the boom operation part 71, from a lever neutral position thereof in a boom raising operation direction, and the boom lowering operation is an operation of tilting the operation lever from the lever neutral position in a boom lowering operation direction opposite to the boom raising operation direction.

To the turning operation part 77 is applied a turning operation. The turning operation is an operation for causing the upper turning body 13 shown in FIG. 1 to make a turning motion to the lower traveling body 11, specifically, being an operation for operating the turning motor 47. The turning operation part 77 outputs a turning command corresponding to the turning operation applied to the turning operation part 77. The turning operation part 77 according to this embodiment outputs a turning pilot pressure corresponding to the turning operation. The turning operation part 77 is connected to the turning pilot port 57*a* of the turning control valve 57 via a turning pilot line 67 and connected to the turning pilot port 57*b* via a not-graphically-shown turning pilot line. The turning operation part 77, thus, inputs the turning pilot pressure to any of the turning pilot ports 57*a* and 57*b* of the turning control valve 57 through the turning pilot line 67 or the not-graphically-shown turning pilot line. The turning operation according to this embodiment is an operation of tilting an operation lever included in the turning operation part 77 in a first turning operation direction or a second turning operation direction opposite to the first turning operation direction. The turning operation part 77 inputs the turning pilot pressure to the turning pilot port that corresponds to the direction of the turning operation applied to the operation lever out of the pair of turning pilot ports 57*a* and 57*b*.

The pilot pressure limiting valve 60, an example of a work command adjuster, is operated by input of a pilot pressure limitation command from the controller 90 to the pilot pressure limiting valve 60 to limit a boom raising command (boom raising pilot pressure) that is input from the boom operation part 71 to the boom raising pilot port 52*a* of the second boom control valve 52 through the second boom raising pilot line 62 in accordance with the pilot pressure limitation command. The pilot pressure limitation command is an example of a work adjustment command for changing the magnitude of the work command. The limitation of the boom raising pilot pressure results in the limitation of the opening degree of the second boom control valve 52. Specifically, the pilot pressure limiting valve 60 limits, that is, reduces, the boom raising pilot pressure that is input from the boom operation part 71 to the second boom control valve 52 in accordance with the pilot pressure limitation command. The pilot pressure limiting valve 60 according to this embodiment is a pressure reducing solenoid valve, which is operated by input of an electric signal, specifically an instruction current Ir shown in FIG. 6, or an instruction current Is shown in FIG. 7, to reduce the boom raising pilot pressure that is output from the boom operation part 71, in accordance with the pilot pressure limitation command, and to input the thus reduced pressure pilot pressure to the boom raising pilot port 52*a* as the final boom raising pilot pressure. Specifically, the pilot pressure limiting valve 60 is configured to change the opening degree of the pilot pressure limiting valve 60 in response to a pilot pressure limitation command that is input to the pilot pressure limiting valve 60, reducing the boom raising pilot pressure in accordance with the opening degree. To the pilot pressure limiting valve 60 is applicable an inverse proportional solenoid valve, the opening degree of which is reduced with an increase in a pilot pressure limitation command that is input to the pilot pressure limiting valve 60, specifically, an instruction current Ir or an instruction current Is that is calculated on the basis of the relationship shown in FIGS. 6 and 7, decreasing the pilot pressure that is output from the pilot pressure limiting valve 60. The pilot pressure limiting valve 60 may be composed of a valve having an opening degree that is increased with an increase in the value of the instruction current input thereto, for example, a proportional pressure reducing solenoid valve.

In the present invention, the device for inputting the work command that has been already changed (the boom raising command in FIG. 2) to the second work actuator control valve (the second boom control valve 52 in FIG. 2) is not limited to a pressure reducing valve such as the pilot pressure limiting valve 60 but also allowed to be one that outputs the pilot pressure by itself and changes the pilot pressure in response to the work adjustment command. For example, if the second boom control valve 52 is operated by an electrical signal, the controller 90 may be configured to input the work command signal having been changed by the controller 90 itself to the second boom control valve 52.

The plurality of operation amount detectors 80 detect the magnitudes of respective operations applied to the plurality of operation parts 70, namely, respective operation amounts. Each of the plurality of operation amount detectors 80 detects, for example, a command value which is the magnitude of a command output from the operation part 70 corresponding to the operation amount detector 80. In the embodiment shown in FIG. 2, each of the plurality of operation amount detectors 80 includes a pressure sensor for detecting a pilot pressure. When the operation part 70 is one that outputs an electric signal, the operation amount detector 80 corresponding thereto detects an electric signal. In this case, the operation amount detector 80 may be constituted by a part of the controller 90.

The plurality of operation amount detectors 80 according to this embodiment include a boom raising pilot pressure sensor 81 and a turning pilot pressure sensor 87. The boom raising pilot pressure sensor 81 converts the magnitude of the boom raising pilot pressure output from the boom operation part 71 into an electric signal, thereby allowing a boom raising operation amount which is the magnitude of the boom raising operation applied to the boom operation part 71 to be determined. The turning pilot pressure sensor 87 converts the magnitude of the turning pilot pressure output from the turning operation part 77 into a detection signal, which is an electric signal, and inputs the detection signal to the controller 90, thereby allowing a turning operation amount which is the magnitude of the turning operation applied to the turning operation part 77 to be determined.

The controller 90 performs acquisition of detection signals that are input from the plurality of operation amount detectors 80, output of a plurality of command signals, a plurality of arithmetic operations (processing, judgment, calculation), storage of information, and the like. The controller 90 includes an adjustment command part that generates a work adjustment command and inputs the command to the work command adjuster. The adjustment command part according to this embodiment inputs an electric signal corresponding to the pilot pressure limitation command, specifically, an instruction current Ir shown in FIG. 6 or an instruction current Is shown in FIG. 7, to the pilot pressure limiting valve 60, thereby operating the opening degree of the pilot pressure limiting valve 60.

Next will be described the action of the work machine 1 according to this embodiment.

For causing the boom 15*a* to make a boom rising motion, an operator applies a boom raising operation to the boom operation part 71. In response to the boom raising operation, the boom operation part 71 outputs a boom raising pilot pressure which is a work command. The boom raising pilot pressure is input to the boom raising pilot port 51*a* of the first boom control valve 51 as it is through the first boom raising pilot line 61, thereby opening the first boom control valve 51 to open a flow path that communicates the first pump 31 with the head chamber 41*a* of the boom cylinder 41. The opening area of the flow path, that is, the opening degree of the first boom control valve 51, corresponds to the magnitude of the boom raising pilot pressure. The flow path allows the hydraulic fluid discharged from the first pump 31 to be supplied to the head chamber 41*a* through the first boom control valve 51. The boom cylinder 41 is thereby expanded to move the boom 15*a* rotationally upward to the upper turning body 13 shown in FIG. 1. Thus, the boom 15*a* is caused to make a boom rising operation, which is an example of the "specific work motion".

The boom raising pilot pressure output by the boom operation part 71 is also input to a pilot pressure limiting valve 60 provided in the second boom raising pilot line 62, and the pilot pressure limiting valve 60 inputs the boom raising pilot pressure that has been reduced in response to the pilot pressure limitation command that is input to the pilot pressure limiting valve 60 to the boom raising pilot port 52*a* of the second boom control valve 52. The second boom control valve 52 is opened at an opening degree corresponding to the magnitude of the boom raising pilot pressure that has been reduced by the pilot pressure limiting valve 60, thereby opening the flow path that communicates the second pump 32 with the head chamber 41*a* of the boom cylinder 41 and making the opening area of the flow path be an opening area corresponding to the magnitude of the boom raising pilot pressure. The flow path allows the hydraulic fluid discharged from the second pump 32 to be supplied to the head chamber 41*a* through the second boom control valve 52. The hydraulic fluid thus discharged from the second pump 32 to flow through the second boom control valve 52 is merged with the hydraulic fluid discharged from the first pump 31 to be supplied to the head chamber 41*a*. This merge increases the flow rate of the hydraulic fluid supplied to the head chamber 41*a* as compared with the case where only the hydraulic fluid discharged from the first pump 31 is supplied to the head chamber 41*a*, thereby increasing the driving speed of the boom cylinder 41.

On the other hand, upon the application of a turning operation to the turning operation part 77 by an operator, the turning operation part 77 outputs a turning pilot pressure which is a turning command corresponding to the turning operation. The turning pilot pressure is input to any of the pair of turning pilot ports 57*a* and 57*b* of the turning control valve 57, whereby the turning control valve 57 is opened to open the flow path that connects the second pump 32 with the turning motor 47 and to make the opening area of the flow path be an opening area corresponding to the magnitude of the turning pilot pressure. The flow path allows the hydraulic fluid discharged from the second pump 32 to be supplied to the turning motor 47 through the turning control valve 57. The turning motor 47 is thereby rotationally driven to cause the upper turning body 13 shown in FIG. 1 to make a turning motion to the lower traveling body 11.

Figure 3:
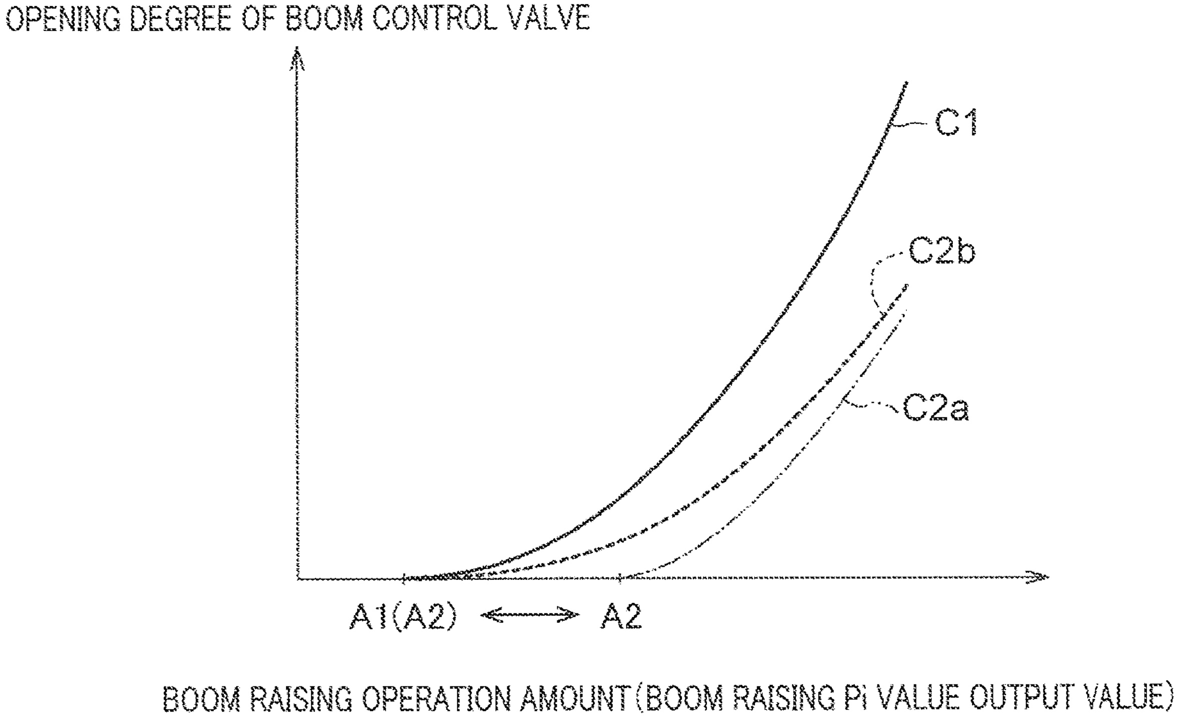
FIG. 3 is a graph showing a relationship between a boom raising operation amount and respective opening degrees of a first boom control valve 51 and a second boom control valve 52 included in the hydraulic circuit.

FIG. 3 shows the characteristics of respective opening degrees of the first boom control valve 51 and the second boom control valve 52 to the boom raising operation amount, which is the magnitude of the boom raising operation applied to the boom operation part 71. As indicated by the solid line C1 shown in FIG. 3, the first boom control valve 51 is opened when the boom raising operation amount corresponding to the boom raising pilot pressure output value (work command output value) which is the value of the boom raising pilot pressure output from the boom operation part 71 becomes equal to or greater than the first minimum operation amount A1, and the opening degree of the first boom control valve 51 is increased with an increase in the boom raising operation amount and an increase in the boom raising pilot pressure output value associated therewith. On the other hand, as indicated by the two-dot chain line C2*a* and the broken line C2*b* shown in FIG. 3, the characteristic of the opening degree of the second boom control valve 52 to the boom raising operation amount is changed by the change in the opening degree of the pilot pressure limiting valve 60 interposed between the boom raising pilot port 52*a* of the second boom control valve 52 and the boom operation part 71. It is, therefore, possible to change the valve opening characteristic of the second boom control valve 52 to the boom raising operation amount by the pilot pressure limitation command (work adjustment command) that is input to the pilot pressure limiting valve 60 by the adjustment command part of the controller 90. The adjustment command part of the controller 90 determines whether the below-described asynchronization control or synchronization control should be executed, on the basis of the boom raising operation and the turning operation, generating the pilot pressure limitation command for executing the determined control and inputting the command to the pilot pressure limiting valve 60.

As indicated by the two-dot line C2*a* shown in FIG. 3, the asynchronization control is a control of limiting the boom raising pilot pressure to be input to the boom control valve 52 through the boom pilot pressure limiting valve 60 so as to make the second minimum operation amount A2 which is the minimum operation amount of the boom raising operation amount required for opening the first boom control valve 51 from the valve closed state be greater than the first minimum operation amount A1 which is the minimum value of the boom raising operation amount corresponding to the boom raising pilot pressure output value required for opening the boom control valve 51. In other words, the asynchronization control is a control for rendering the timing at which the second boom control valve 52 is brought into the fully closed state by the decrease in the boom raising operation amount earlier than the timing at which the first boom control valve 51 is fully closed, that is, conversely, a control of rendering the timing at which the second boom control valve 52 starts to be opened by the increase in the boom raising operation amount later than the timing at which the first boom control valve 51 starts to be opened.

Figure 6:
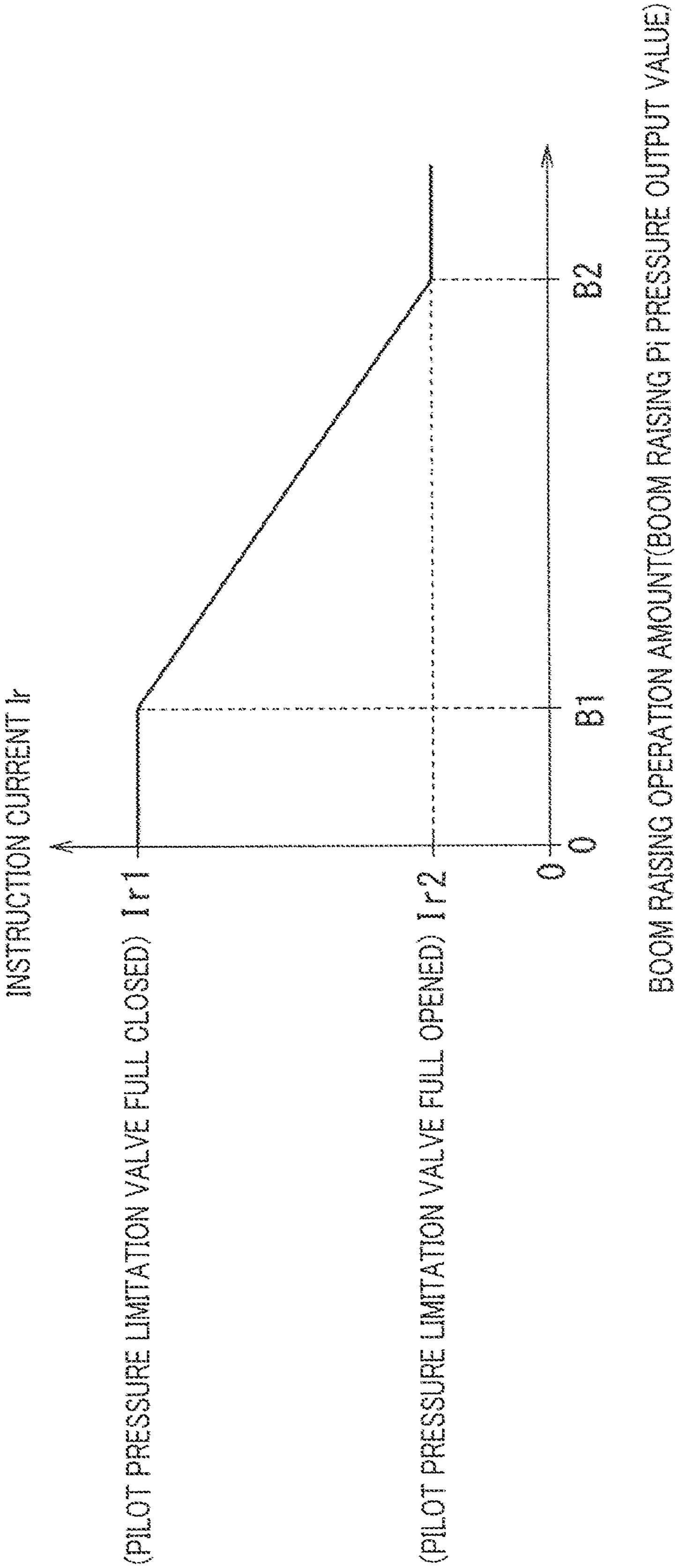
FIG. 6 is a graph showing an instruction current Ir that is calculated in accordance with the boom raising operation amount.
Figure 7:
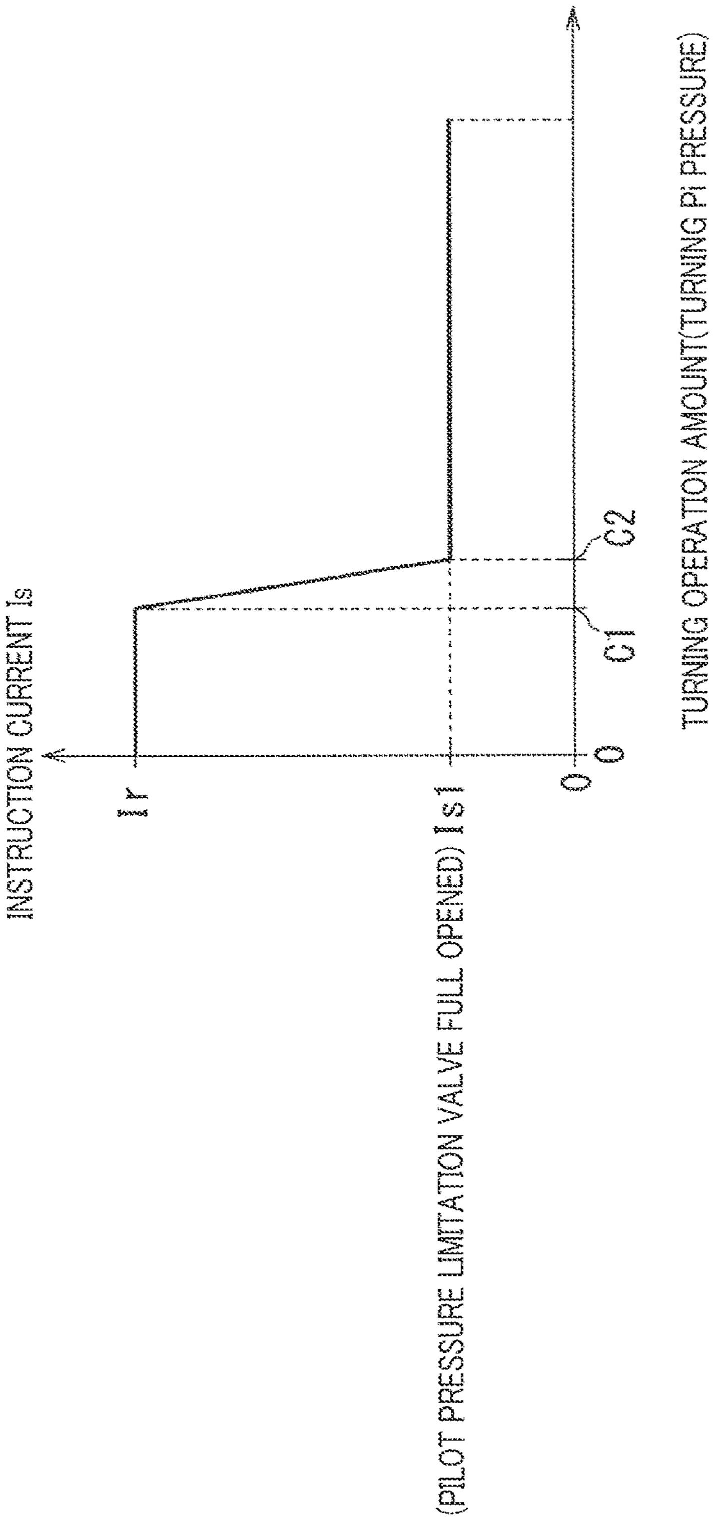
FIG. 7 is a graph showing an instruction current Is that is calculated in accordance with the turning operation amount.

Specifically, as will be described in more detail later, the adjustment command part of the controller 90 inputs the instruction current Jr as shown in FIG. 6, that is, the instruction current Ir which is decreased with an increase in the boom raising operation amount and the boom raising pilot pressure output value corresponding thereto, thereby executing the asynchronization control.

Below is shown an example of the action during the execution of the asynchronization control.

The boom raising operation amount is zero when the operation lever of the boom operation part 71 is in the lever neutral position, and respective opening degrees of the first and second boom control valves 51 and 52 are also zero. Along with the tilt of the operation lever from the lever neutral position to the boom raising operation direction, the boom raising operation amount is increased, and at the time when the boom raising operation amount becomes larger than the first minimum operation amount A1, the first boom control valve 51 is shifted from the valve closed state to the valve opened state. When the boom raising operation amount is larger than the first minimum operation amount A1 and is equal to or less than the second minimum operation amount A2, the first boom control valve 51 is opened at an opening corresponding to the boom raising operation amount whereas the second boom control valve 52 is kept in the fully closed state. This causes the hydraulic fluid discharged from the first pump 31 to be supplied to the head chamber 41*a* of the boom cylinder 41 through the first boom control valve 51, thereby expanding the boom cylinder 41. On the other hand, the second boom control valve 52 kept in the fully closed state prevents the hydraulic fluid discharged from the second pump 32 from being supplied to the boom cylinder 41.

When the boom operation part 71 is further tilted enough to render the boom raising operation amount equal to or greater than the second minimum operation amount A2, the second boom control valve 52 is opened, in addition to the first boom control valve 51, at an opening corresponding to the boom raising operation amount, allowing a part of the hydraulic fluid discharged from the second pump 32 to be merged with the hydraulic fluid which is supplied from the first pump 31 to the head chamber 41*a* of the boom cylinder 41 through the first boom control valve 51 to be supplied to the head chamber 41*a*.

This asynchronization control is performed at least in a single boom raising operation state. The single boom raising operation state is a state where only the work operation is performed out of the turning operation and the boom raising operation, being an example of a single work operation state where only the boom raising operation is performed. Only when the boom raising operation amount is large, that is, only when the speed required for the boom raising operation is large, the asynchronization control allows the hydraulic fluid discharged from the second pump 32 to be merged with the hydraulic fluid discharged from the first pump 31 to be supplied to the boom cylinder 41 to thereby increase the speed of the boom rising motion.

In this embodiment, the asynchronization control is executed also in the case where the turning operation is a turning acceleration operation for accelerating the turning motion of the upper turning body 13 in a combination operation state where the turning operation and the boom raising operation are simultaneously performed. Below will be shown an example of the advantages thereof. The shift from a stationary state where neither of the boom raising operation and the turning operation are performed to the combination operation state where the boom raising operation and the turning operation are simultaneously performed causes the operation of the turning motor 47 to require a large power for activating the upper turning body 13 which has a large moment of inertia, specifically, a larger power than that required in the state where the turning motor 47 is already moved. If executed at this time, the asynchronization control can cause the second boom control valve 52 to be kept in the fully closed state until the boom raising operation amount reaches the second minimum operation amount A2 to prevent the hydraulic fluid discharged from the second pump 32 from being supplied to the boom cylinder 41, thereby allowing the hydraulic fluid to be supplied to the turning motor 47 through the turning control valve 57, that is, allowing sufficient power to be supplied to the turning motor 47 for the activation thereof. In contrast, after the start of the movement of the turning motor 47 (i.e., after the start of the turn of the upper turning body 13), the power required for driving the turning motor 47 is decreased, causing a margin to supply the discharge fluid from the second pump 32 to the boom cylinder 41. Meanwhile, the second boom control valve 52 is opened at the time when the boom raising operation amount becomes equal to or more than the second minimum operation amount A2 to allow the hydraulic fluid discharged from the second pump 32 to be merged with the hydraulic fluid supplied from the first pump 31 to the head chamber 41*a* of the boom cylinder 41, which can increase the driving speed of the boom cylinder 41 and the boom raising operation speed of the boom 15*a* corresponding thereto, in comparison with the case where only the hydraulic fluid discharged from the first pump 31 is supplied to the boom cylinder 41.

On the other hand, in the case where the turning operation in the combination operation state is a turning deceleration operation for decelerating the turning motion of the upper turning body 13, the adjustment command part of the controller 90 performs not the asynchronization control but a synchronization control which will be below described in detail. That is because reducing the boom raising operation amount during the execution of the asynchronization control in the combination operation state where the boom raising operation and the turning operation are simultaneously performed causes the second boom control valve 52 to be closed earlier than the first boom control valve 51 to thereby increase the angular acceleration of the turning motor 47. In detail, the reduction in the boom raising operation amount to the second minimum operation amount A2 or less during the execution of the performance of the turning operation brings the second boom control valve 52 into the fully closed state from the valve opened state prior to the first boom control valve 51, thereby causing the hydraulic fluid which had been allowed to be supplied from the second pump 32 to the boom cylinder 41 to flow to the turning motor 47. This rapidly increases the pressure of hydraulic fluid to be supplied to the turning motor 47. For example, it instantaneously increases the pressure from the working pressure (holding pressure) of the boom cylinder 41 to the relief pressure of the turning motor 47. The sudden increase in the pressure of the hydraulic fluid supplied to the turning motor 47 increases the output torque of the turning motor 47, increasing the angular acceleration of the output shaft of the turning motor 47. Especially in the case where a turning deceleration operation is performed by an operator for decelerating the turning motor 47, the deceleration of the turning motor 47 is lowered regardless of the intention of the operator who performs the turning deceleration operation. On the other hand, the first boom control valve 51 is kept opened until the boom raising operation amount becomes equal to or less than the first minimum operation amount A1 even when the boom raising operation amount decreases to the second minimum operation amount A2 or less to make the second boom control valve 52 fully closed. Thus caused is an unexpected increase in the angular acceleration of the upper turning body 13 for an operator in a situation where the operation lever of the boom operation part 71 is not returned to the lever neutral position. In other words, there is a possibility of rapid increase in the speed of the turning motion of the upper turning body 13 in spite that the operator performs a turning deceleration operation for decelerating the turning motion of the upper turning body 13 while reducing the boom raising operation amount. Besides, the increase in the speed of turning motion of the upper turning body 13 in spite of the performance of the turning deceleration operation involves unnecessary energy consumption.

For the above reason, the adjustment command part of the controller 90 performs the following synchronization control when the turning operation is the turning deceleration operation in the combination operation state.

The synchronization control is a control of setting the pilot pressure limitation command (instruction voltage Is) to be input to the pilot pressure limiting valve 60 so as to render the first minimum operation amount A1, which is the boom raising operation amount when the first boom control valve (51) is shifted from the valve opened state to the fully closed state, equal to the second minimum operation amount A2, which is the boom raising operation amount when the second boom control valve 52 is shifted from the valve opened state to the fully closed state. Specifically, the adjustment command part according to this embodiment employs the instruction current Is as shown in FIG. 7 to thereby execute the synchronization control. The instruction current Is is kept at a fixed minimum instruction current value Is1 when the turning operation amount is equal to or more than a preset second turning operation amount C2, that is, when it can be judged that the turning operation is being substantially performed, wherein the minimum instruction current value Is1 is the value of the instruction current Is to maximize the opening degree of the pilot pressure limiting valve 60. Thus, the opening characteristic of the second boom control valve 52 (the characteristic of opening degree of the second boom control valve 52 corresponding to the boom raising pilot pressure which is input to the boom raising pilot port 52*a*) is set so as to render the second minimum operation amount A2 equal to the first minimum operation amount A1 in a state where the opening degree of the pilot pressure limiting valve 60 is maximum.

The synchronization control does not absolutely require the first minimum operation amount A1 and the second minimum operation amount A2 to be completely (strictly) coincident with each other, only having to be matched enough to prevent the speed of the turning motor 47 from being unintendedly increased by the deviation between the first and second minimum operation amounts A1 and A2 due to the asynchronization control. The synchronization control is, thus, a control for synchronize the timing at which the first boom control valve 51 is fully closed with the timing at which the second boom control valve 52 is fully closed to prevent the speed of the turn from being unexpectedly increased for an operator who reduces the boom raising operation amount in the combination operation state.

The reason why the synchronization control is capable of preventing the speed of the turning motor 47 from unexpectedly increased is as follows. Even when the boom raising operation amount is decreased from an amount larger than the second minimum operation amount A2 to an amount equal to or less than the second minimum operation amount A2 during the execution of the asynchronization control, the second boom control valve 52 maintains the valve opening state similarly to the first boom control valve 51 until the boom raising operation amount reaches the first minimum operation amount A1 (i.e., the second minimum operation amount A2 in the synchronization control execution). Then, at the time when the boom raising operation amount reaches the first minimum operation amount A1, the first boom control valve 51 is fully closed and, at the same time, the second boom control valve 52 is also fully closed because the second minimum operation amount A2 matches the first minimum operation amount A1. This effectively restrains the angular acceleration of the turning motor 47 from being suddenly changed by the advanced close of the second boom control valve 52 at unexpected timing for an operator before the boom raising operation amount becomes zero when the boom raising operation amount is reduced in the combination operation state.

In the case where the operation amount of the turning operation is maintained at a fixed operation amount greater than zero in the combination operation state, the adjustment command part of the controller 90 may perform either the synchronization control or the asynchronization control. Executing the synchronization control can restrain the speed of the turning motor 47 from being rapidly increased by the full close of the second boom control valve 52 at the unexpected timing for an operator before the boom raising operation amount which is being decreased becomes zero.

In the case where the turning acceleration operation which is a turning operation for accelerating the turning motor 47 is performed in the combination operation state, the adjustment command part of the controller 90 may perform either the asynchronization control or the synchronization control. Although the performance of the asynchronization control in this case generates a possibility that the advanced close of the second boom control valve 52 prior to the first boom control valve 51 causes the speed of the turning motor 47 to be increased, it gives poor uncomfortable feeling to an operator because the increase in the speed meets the intension of the operator who is performing the turning acceleration operation. Meanwhile, during the period in which the boom raising operation amount is larger than the first minimum operation amount A1 and equal to or less than the second minimum operation amount A2, the second boom control valve 52 is fully closed to thereby allow the hydraulic fluid discharged from the second pump 32 to be supplied to the turning motor 47 while being not supplied to the boom cylinder 41. This enables the acceleration of the turning motor 47, that is, the turning acceleration of the upper turning body 13 to be secured. In particular, improved is the acceleration property when the turning motor 47 is activated from the stopped state, that is, the starting property of the turning of the upper turning body 13.

The synchronization control, if being performed when the turning acceleration operation is performed in the combination operation state, can restrain the speed of the turning motor 47 from being rapidly increased in the same manner as described above.

Figure 4:
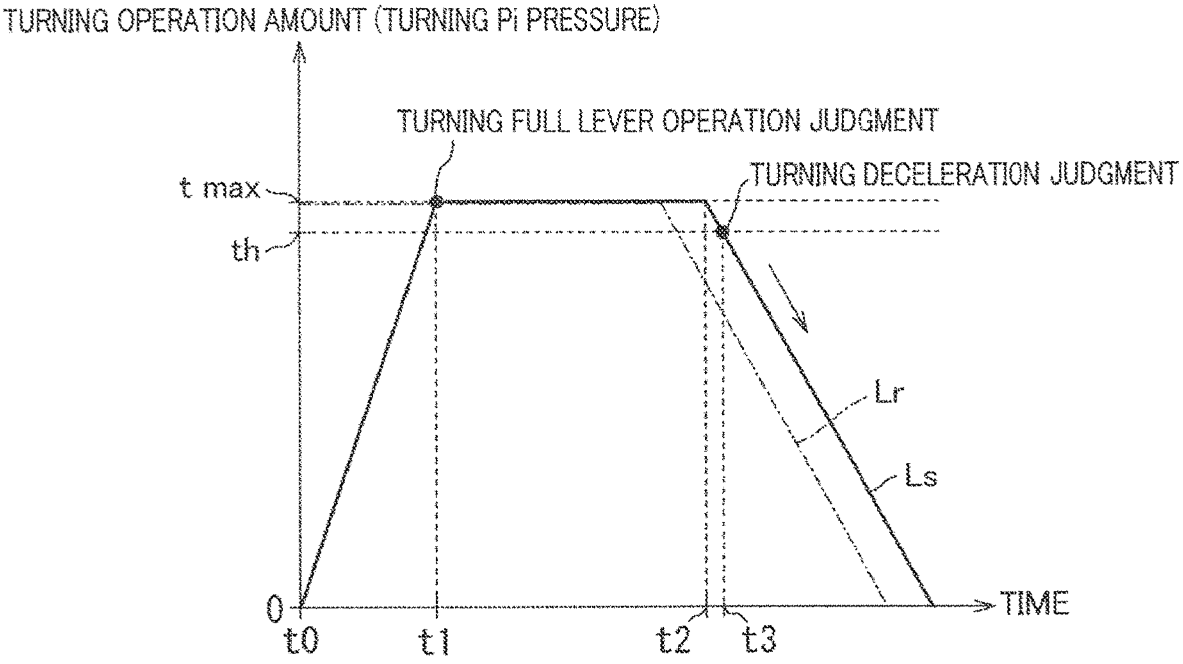
FIG. 4 is a graph showing an example of a temporary change in a turning operation amount and a boom raising operation amount.

For the above case of determining whether synchronization control and asynchronization control should be performed based on whether or not the turning deceleration operation is being performed, it is preferable that the controller 90 further includes a turning deceleration operation judgment part that judges whether or not the turning deceleration operation is being performed. The turning deceleration judgment part can judge that the turning deceleration operation is being performed, for example, when the turning operation amount, which is the magnitude of the turning operation, is shifted from a state of being larger than the predetermined deceleration threshold th shown in FIG. 4 to a state of being smaller than the deceleration threshold th. The deceleration threshold th is a preset threshold value for the turning operation amount. The deceleration threshold th is stored in the controller 90. The deceleration threshold th is preferably set to a value that allows it to be judged that the turning operation amount is reduced (a full operation is not applied) from a state where the turning operation amount is the maximum operation amount tmax, for example, a state where the operation lever of the turning operation part 77 is fully operated. The deceleration threshold th is set, for example, to a value in the vicinity of the maximum operation amount which is the maximum value of the turning operation amount as shown in FIG. 4 In the embodiment, the deceleration threshold th is a value that is set for the turning pilot pressure. If the turning operation part 77 outputs an electric signal having a current value corresponding to the turning operation amount, the deceleration threshold th is set for the current value.

FIG. 4 indicates an example of the temporary change in the turning operation amount and the boom raising operation amount by a solid line LS and a dashed line LS, respectively. In this example, the turning operation amount is increased from time t0 to time t1. From the time t1 to the time t2, the turning operation amount is maintained at the maximum operation amount tmax (the full operation is kept). After the time t2, the turning operation amount is reduced to reach the deceleration threshold th at the time t3. At this point in time, the turning deceleration operation judgment part of the controller 90 judges that the turning deceleration operation is being performed. Since the boom raising operation is performed at this time T3, the control performed by the controller 90 is shifted from the asynchronization control to the synchronization control at this time. This causes, thereafter, the first boom control valve 51 and the second boom control valve 52 to be shifted to the fully closed state at the same time until the boom raising operation amount becomes zero, thereby preventing the speed of the turning motor 47 from being rapidly increased by the advanced close of the second boom control valve 52 along with the decrease in the boom raising operation amount indicated by the dashed line Lr.

The method for the judging the turning deceleration operation is, however, not limited thereto. For example, the turning deceleration operation judgment part of the controller 90 may judge whether or not the turning deceleration operation is performed on the basis of the change in the turning operation amount per part time and other values.

As described above, the controller 90 executes the asynchronization control and the synchronization control by inputting a pilot pressure limitation command (the instruction current Ir for asynchronization control shown in FIG. 6 or the instruction current Is for synchronization control shown in FIG. 7), which is a work adjustment command, to the pilot pressure limiting valve 60, to operate the opening degree of the pilot pressure limiting valve 60. The pilot pressure limiting valve 60 limits the boom raising command that is input from the boom operation part 71 to the second boom control valve 52, i.e., the boom raising pilot pressure that is input to the boom raising pilot port 52*a* of the second boom control valve 52 in this embodiment, in accordance with the pilot pressure limitation command that is input from the controller 90. The adjustment command part of the controller 90, therefore, generates such a pilot pressure limitation command as to render the limitation of the boom raising pilot pressure by the pilot pressure limiting valve 60 when the synchronization control is executed smaller than the limitation of the boom raising pilot pressure when the asynchronization control is executed, and inputs the command to the pilot pressure limiting valve 60. In other words, the adjustment command part of the controller 90 generates the pilot pressure limitation command so as to render the opening degree of the second boom control valve 52 corresponding to any boom raising operation amount when the synchronization control is performed larger than that when the asynchronization control is performed. The pilot pressure limitation command also includes a command to release the limitation of the boom raising pilot pressure, that is, a command to maximize the opening degree of the pilot pressure limiting valve 60. This command is generated for the synchronization control in this embodiment. During the execution of the synchronization control and the asynchronization control, the controller 90 may either change or not change the boom raising pilot pressure that is input to the first boom control valve 51. In the above embodiment, the opening degree of the first boom control valve 51 is directly operated by the boom raising pilot pressure that is output from the boom operation part 71 without the control by the controller 90.

Figure 5:
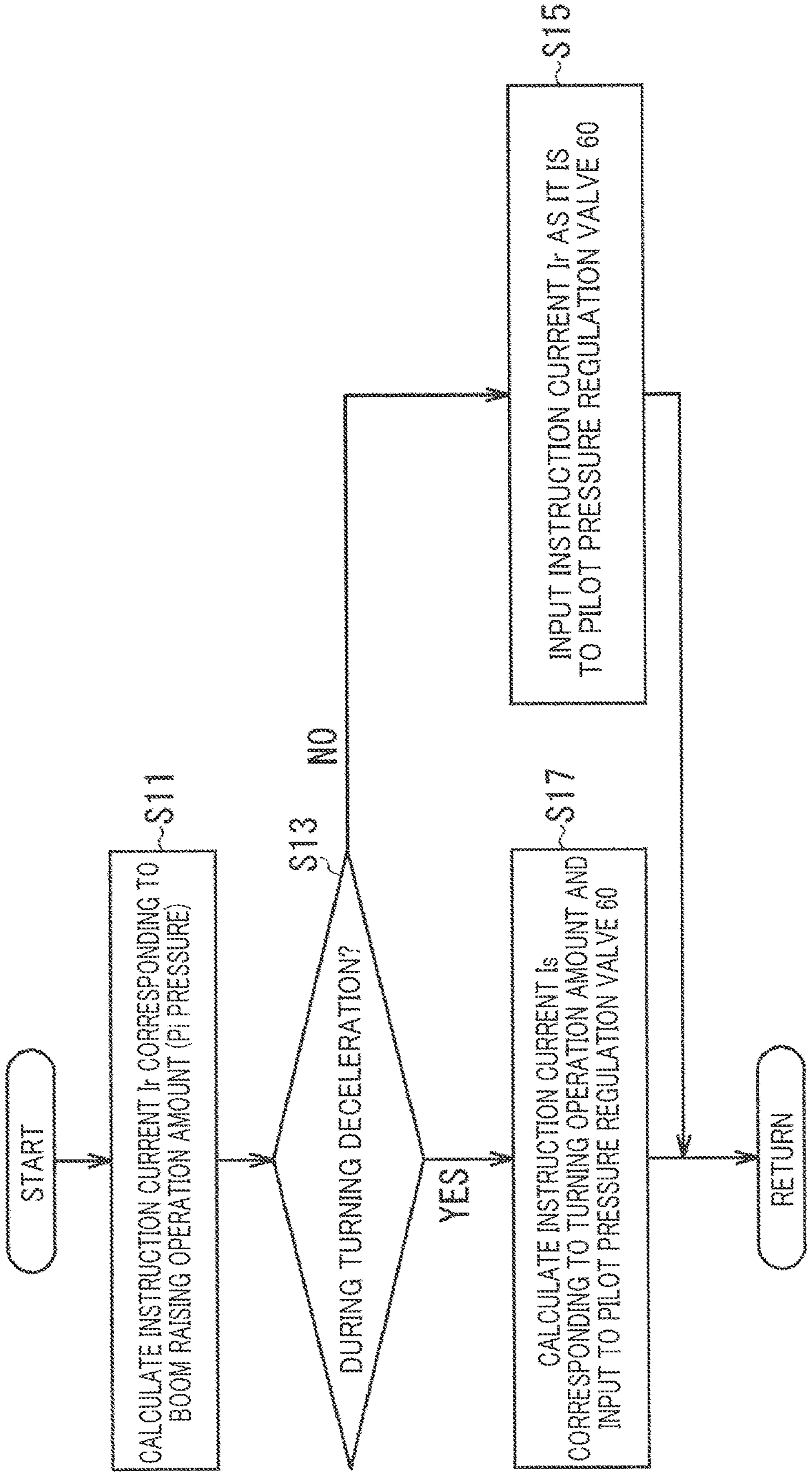
FIG. 5 is a flowchart showing an operation of calculating an instruction current to he input from a controller 90 connected to the hydraulic circuit to the pilot pressure limiting valve 60.

The execution of the asynchronization control and the synchronization control based on the boom raising operation and the turning operation can be made, for example, through the processing shown in the flowchart of FIG. 5.

First, the adjustment command the controller 90 calculates the instruction current Ir (command value) corresponding to the actual boom raising pilot pressure (specifically, the boom raising pilot pressure that is detected by the boom raising pilot pressure sensor 81 and is output from the boom operation part 71) (step S11 shown in FIG. 5), based on the predetermined characteristic of the instruction current Ir, that is, the characteristic of the instruction current Ir to the boom raising operation amount (the boom raising pilot pressure). Specifically, the adjustment command part of the controller 90 calculates such an instruction current Ir as to increase the opening degree of the pilot pressure limiting valve 60 and the opening degree of the second boom control valve 52 with an increase in the boom raising operation amount (i.e., a small instruction current Ir). In other words, the adjustment command part of the controller 90 calculates such an instruction current Ir as to decrease the opening degree of the pilot pressure limiting valve 60 and the opening degree of the second boom control valve 52 with a decrease in the boom raising operation amount (i.e., a large instruction current Is).

Specifically, the controller 90 stores a map for specifying the instruction current Ir corresponding to the boom raising operation amount (boom raising pilot pressure) as shown in FIG. 6, and calculates the instruction current Ir corresponding to the boom raising operation amount, by use of the map, on the basis of the boom raising operation amount (the boom raising pilot pressure detection signal that is input from the boom raising pilot pressure sensor 61 to the controller 90). The characteristic shown in FIG. 6 is set on the premise of the pilot pressure limiting valve 60 configured to have an opening degree that is decreased with an increase in the instruction current Ir. According to the characteristic shown in FIG. 6, the adjustment command part of the controller 90 calculates a maximum instruction current Ir1 for fully closing the pilot pressure limiting valve 60 when the boom raising operation amount is less than the first boom raising operation amount B1, and calculates a minimum instruction current Ir2 for fully opening the pilot pressure limiting valve 60 when the boom raising operation amount is larger than the second boom raising operation amount B2 (>B1). Besides, when the boom raising operation amount is equal to or more than the first boom raising operation amount B1 and equal to or less than the second boom raising operation amount B2, the adjustment command part calculates such an instruction current Ir2 as to be decreased with an increase in the boom raising operation amount.

At the stage of this step S11, the instruction current to be actually input to the pilot pressure limiting valve 60 has not been yet determined.

Next, the turning deceleration operation judgment part of the controller 90 judges whether or not the turning deceleration operation is being performed (step S13)

When it is judged that the turning operation is not being performed or that the turning operation being performed is not a turning deceleration operation (NO in step S13 shown in FIG. 5), the adjustment command part of the controller 90 adopts the instruction current Ir that corresponds to the boom raising operation amount and is calculated in step S11, and inputs it to the pilot pressure limiting valve 60 (step S15 shown in FIG. 5). In summary, the adjustment command part of the controller 90 determines the pilot pressure limitation command (the instruction current Ir) to be actually input to the pilot pressure limiting valve 60, on the basis of the boom raising operation amount and regardless of the turning operation amount. The asynchronization control is thus executed in the single boom raising operation state where a boom raising operation is performed whereas no turning operation is performed or a state which is a combination operation state but in which the turning operation is not a turning deceleration operation.

On the other hand, when the turning deceleration operation judgment part judges that the turning deceleration operation is being performed (YES in step S13 shown in FIG. 5), the adjustment command part calculates the instruction current Is corresponding to the turning operation amount, by the map shown in FIG. 7, and inputs it to the pilot pressure limiting valve 60 in step S17. The controller 90, which stores the map for specifying the instruction current Is corresponding to the map or the turning operation amount (specifically, the turning pilot pressure detected by the turning pilot pressure sensor 87), calculates the instruction current Is corresponding to the turning operation amount based on the map, and inputs it to the pilot pressure limiting valve 60.

According to the map shown in FIG. 7, when the turning operation amount is equal to or less than a preset first turning operation amount C1, the adjustment command part of the controller 90 sets the instruction current Ir which is calculated on the basis of the boom raising operation amount in the step S11 as it is to the instruction current Is. The first turning operation amount C1 is the maximum value of a turning operation amount to allow the turning operation to be regarded as being substantially not performed, being a minute value in the vicinity of zero. Thus, even if the turning deceleration operation is performed, when it results in the turning operation amount close to zero enough to allow the turning operation to be regarded as being not performed, it is no longer the combination operation state; therefore, an instruction current Ir for asynchronization control is adopted as the turning operation amount. The control to be performed is thereby shifted from the previous synchronization control to the asynchronization control. Besides, when no boom raising operation is performed, that is, when the boom raising operation amount is smaller than the first minimum operation amount A1, both the first and second boom control valves 51 and 52 are brought into the fully closed state.

In contrast, when the turning operation amount is equal to or more than a second turning operation amount C2 which is slightly larger than the first turning operation amount C1, that is, when the turning operation can be regarded as being substantially performed, the adjustment command part of the controller 90 makes the instruction current Is be the minimum instruction current Is1 to thereby execute the synchronization control. The minimum instruction current Is1 is equivalent to the minimum instruction current Ir2, which is the minimum value of the instruction current corresponding to the boom raising operation amount, and which is a current value to fully open the pilot pressure limiting valve 60 and the second boom control valve 52. In short, in the synchronization control, the adjustment command part of the controller 90 makes the instruction current Is be the minimum instruction current Is, regardless of the boom raising operation amount, to release the limitation of the boom raising pilot pressure by the pilot pressure limiting valve 60. The difference between the first turning operation amount C1 and the second turning operation amount C2 is set to be small enough to allow the instruction current Is to be continuously (linearly in the example of FIG. 7) reduced from the instruction current Ir to the minimum instruction current Is1. FIG. 7, however, shows just an example of the instruction current Is, allowed to be variously modified. For example, when the turning operation amount is equal to or more than the second turning operation amount C2, the instruction current Is may be calculated based on the boom raising operation amount so as to establish the synchronization control.

The specific work motion of the work attachment according to the present invention and the work actuator for performing the work operation are not limited to the boom raising operation and the boom cylinder 41, respectively. For example, the work actuator may be either an arm cylinder 43 or a bucket cylinder 45.

The circuit shown in FIG. 2 also can be appropriately modified. For example, the hydraulic actuators other than the work actuator (the boom cylinder 41 in the above embodiment) and the turning motor (the turning motor 47 in the above embodiment) may be connected to either of the first and second pumps 31 and 32 or, alternatively, connected to another hydraulic pump (for example, a third pump), the hydraulic actuators other than the work actuator being, for example, the arm cylinder 43, the bucket cylinder 45, or the traveling motor.

The arithmetic control operations for performing the asynchronization control and the synchronization control are not limited to those shown in the flowchart of FIG. 5. For example, in place of the judgment processing in step S13, may be performed: judging whether or not it is in a combined operation state where the boom raising operation and the turning deceleration operation are simultaneously performed; and determining whether the asynchronization control or the synchronization control should be performed, on the basis of the result of the judgment. Alternatively, the adjustment command part may be configured to perform the synchronization control in the combination operation state, no matter whether or not the turning operation is a turning deceleration operation.

The deceleration threshold th shown in FIG. 4 may be either constant or variable by manual operation or changed automatically depending on some condition.

The number of components of the work machine 1 shown in FIG. 1 may be changed, or some of the components may be omitted. For example, what has been described as a plurality of members or portions that are different from each other may be configured as one member or part. Conversely, what has been described as one member or portion may be provided separately from a plurality of different members or portions.

As described above, a work machine is provided including a turning motor and a work actuator, and being capable of driving the work actuator at a high speed when a work operation for operating the work actuator is large and further capable of restraining the speed of the turning motor from being increased at unexpected timing for an operator when the work operation is reduced from a combination operation state where the work operation and a turning operation for moving the turning motor are simultaneously performed.

Provided is a work machine including: a lower traveling body; an upper turning body mounted on the lower traveling body so as to be turnable; a work attachment mounted on the upper turning body; a work actuator that is driven, by supply of hydraulic fluid to the work actuator, to cause the work attachment to make a specific work motion; a turning motor that is driven, by supply of hydraulic fluid to the turning motor, to cause the upper turning body to make a turning motion; a first pump that discharges hydraulic fluid; a second pump that discharges hydraulic fluid separately from the first pump; a work operation part that is operated, by a work operation applied to the work operation part for causing the work attachment to make a specific work motion, to output a work command corresponding to a work operation amount that is a magnitude of the work operation; a turning operation part that is operated, by a turning operation applied to the turning operation part for causing the upper turning body to make a specific turning motion, to output a turning command corresponding to the turning operation; a first work actuator control valve provided between the first pump and the work actuator and connected to the work operation part to be opened and closed by input of the work command to the first work actuator control valve so as to change a flow rate of hydraulic fluid supplied from the first pump to the work actuator in accordance with the work command; a second work actuator control valve provided between the second pump and the work actuator and connected to the work operation part to be opened and closed by input of the work command to the second work actuator control valve so as to change a flow rate of hydraulic fluid supplied from the second pump to the work actuator in accordance with the work command; a turning control valve provided between the second pump and the turning motor and connected to the turning operation part to be opened and closed by input of the turning command to the turning control valve so as to change a flow rate of hydraulic fluid supplied from the second pump to the turning motor; a work command adjuster that is operated, by input of a work adjustment command to the work command adjuster, to change a magnitude of the work command to be input from the work operation part to the second work actuator control valve in accordance with the work adjustment command; and a controller. The controller includes an adjustment command part that generates the work adjustment command and inputs the work adjustment command to the work command adjuster. The adjustment command part is configured to perform an asynchronization control of generating the work adjustment command to render a second minimum operation amount with respect to the work operation amount greater than a first minimum operation amount and to input the work adjustment command to the work command adjuster in a single work operation state where the work operation is applied to the work operation part whereas the turning operation is not applied to the turning operation part, and configured to perform a synchronization control of generating the work adjustment command to render the second minimum operation amount equal to the first minimum operation amount and to input the work adjustment command to the work command adjuster at least when the turning operation is a turning deceleration operation for decelerating the turning motion in a combination operation state where the work operation is applied to the work operation part and simultaneously the turning operation is applied to the turning operation part. The first minimum operation amount is the minimum operation amount of the work operation amount to allow the first work actuator control valve to be opened from a valve closed state, and the second minimum operation amount is the minimum amount of the work operation amount to allow the second work actuator control valve to be opened. Hence, the asynchronization control is a control for rendering the timing at which the second work actuator control valve is switched from the valve closed state to a valve opened state later than the timing at which the first work actuator control valve is opened (i.e., for advancing the timing at which the valve is switched from the open state to the closed state), and the synchronization control is a control for rendering respective timings when the first and second work actuator control valves are switched between the open state and the closed valve state equal to each other.

In the work machine, at least in the single work operation state, the adjustment command part generates the work adjustment command for executing the asynchronization control and inputs the command to the work command adjuster, thereby allowing the hydraulic fluid discharged from the second pump to be supplied to the work actuator only when the work operation amount is larger than the second minimum operation amount, that is, only when the required speed is high for a specific work motion to increase the speed of the work actuator; on the other hand, at least when the turning operation is a turning deceleration operation in the combination operation state, the adjustment command part generates the work adjustment command for executing the synchronization control and inputs the command to the work command adjuster, thereby allowing the speed of the turning motor to be prevented from unexpected rapid increase for an operator, which increase can be caused by the advanced full close of the second actuator control valve prior to the first actuator control valve when the operation amount is reduced in the combination operation state.

Each of the first work actuator control valve and the second work actuator control valve can be composed of, for example, a pilot-operated hydraulic selector valve configured to be opened, by input of a pilot pressure thereto, at an opening degree corresponding to the magnitude of the pilot pressure. In this case, it is preferable that: the work operation part is configured to output a pilot pressure to be input to each of the first work actuator control valve and the second work actuator control valve as the work command; the work command adjuster is a pilot pressure limitation valve which is operated, by input of the pilot pressure limitation command, to limit the pilot pressure that is output from the work operation part, so as to reduce an opening degree of the second work actuator control valve in accordance with the pilot pressure limitation command; the adjustment command part is configured to generate the pilot pressure limitation command as the work adjustment command and to input the pilot pressure limitation command to the pilot pressure limiting valve; the pilot pressure limitation command generated by the adjustment command part for the synchronization control is a command for rendering the limitation of the pilot pressure by the pilot pressure limiting valve smaller than the limitation of the pilot pressure according to the pilot pressure limitation command for the asynchronization control. In this mode, the controller can execute both the asynchronization control and the synchronization control by a simple operation of only changing the degree of the limitation of the pilot pressure that is input to the second work actuator control valve from the work operation part.

In the work machine, it is preferable that: the work attachment includes a boom attached to the upper turning body so as to be raisable and lowerable; the work actuator is a boom cylinder expandable and contractable so as to move the boom rotationally vertically to the upper turning body; and the specific work motion that the work actuator causes the work attachment to make is a boom rising motion in which the boom is moved rotationally upward to the upper turning body. For the performance of the boom rising motion, which requires large power, it is particularly effective to supply hydraulic fluid to the work actuator from the second hydraulic pump in the combination operation state.

It is preferable that the controller further includes a turning deceleration operation judgment part that judges whether or not the turning operation applied to the turning operation part is the turning deceleration operation and that the adjustment command part performs the synchronization control only when the turning deceleration operation judgment part judges that the turning operation is the turning deceleration operation in the combination operation state. The controller in this mode can prevent the speed of the turning motor from being increased contrarily to the intention of an operator who is performing the turning deceleration operation; on the other hand, when an operator is performing the turning acceleration operation and the increase in the speed of the turning motor is not contrary to the intention of the operator, the controller can prioritize the supply of hydraulic fluid from the second hydraulic pump to the turning motor by execution of the asynchronization control.

Specifically, the turning deceleration operation judgment part is preferably configured to judge that the turning deceleration operation is being performed when the turning operation amount, which is the magnitude of the turning operation, is shifted from a state where the turning operation amount is larger than a deceleration threshold which is a threshold set for the turning operation amount to a state where the turning operation amount is smaller than the deceleration threshold. The turning deceleration operation judgment part can judge the presence or absence of the turning deceleration operation by a simple operation of comparing the turning operation amount with the deceleration threshold value.

The invention claimed is:

1. A work machine comprising:
- a lower traveling body;
- an upper turning body mounted on the lower traveling body so as to be turnable;
- a work attachment mounted on the upper turning body;
- a work actuator that is driven, by supply of hydraulic fluid to the work actuator, to cause the work attachment to make a specific work motion;
- a turning motor that is driven, by supply of hydraulic fluid to the turning motor, to cause the upper turning body to make a turning motion;
- a first pump that discharges hydraulic fluid;
- a second pump that discharges hydraulic fluid separately from the first pump;
- a work operation part that is operated, by a work operation applied to the work operation part for causing the work attachment to make a specific work motion, to output a work command corresponding to a work operation amount that is a magnitude of the work operation;
- a turning operation part that is operated, by a turning operation applied to the turning operation part for causing the upper turning body to make a specific turning motion, to output a turning command corresponding to the turning operation;
- a first work actuator control valve provided between the first pump and the work actuator and connected to the work operation part to be opened and closed by input of the work command to the first work actuator control valve so as to change a flow rate of hydraulic fluid supplied from the first pump to the work actuator in accordance with the work command;
- a second work actuator control valve provided between the second pump and the work actuator and connected to the work operation part to be opened and closed by input of the work command to the second work actuator control valve so as to change a flow rate of hydraulic fluid supplied from the second pump to the work actuator in accordance with the work command;
- a turning control valve provided between the second pump and the turning motor and connected to the turning operation part to be opened and closed by input of the turning command to the turning control valve so as to change a flow rate of hydraulic fluid supplied from the second pump to the turning motor;
- a work command adjuster that is operated, by input of a work adjustment command to the work command adjuster, to change a magnitude of the work command to be input from the work operation part to the second work actuator control valve in accordance with the work adjustment command; and
- a controller including an adjustment command part that generates the work adjustment command and inputs the work adjustment command to the work command adjuster,
- wherein the adjustment command part is configured to perform an asynchronization control of the work actuator control valves by generating the work adjustment command to render a second minimum operation amount of the second work actuator control valve with respect to the work operation amount greater than a first minimum operation amount of the first work actuator control valve and to input the work adjustment command to the work command adjuster in a single work operation state where the work operation is applied to the work operation part whereas the turning operation is not applied to the turning operation part,
- wherein the adjustment command part is configured to perform a synchronization control of the work actuator control valves by generating the work adjustment command to render the second minimum operation amount of the second work actuator control valve equal to the first minimum operation amount of the first work actuator control valve and to input the work adjustment command to the work command adjuster at least when the turning operation is a turning deceleration operation for decelerating the turning motion in a combination operation state where the work operation is applied to the work operation part and simultaneously the turning operation is applied to the turning operation part, and
- wherein the first minimum operation amount is a minimum operation amount of the work operation amount to allow the first work actuator control valve to be shifted from a valve opened state to a fully closed state, and the second minimum operation amount is a minimum amount of the work operation amount to allow the second work actuator control valve to be shifted from a valve opened state to a fully closed state.

2. The work machine according to claim 1, wherein each of the first work actuator control valve and the second work actuator control valve is composed of a pilot-operated hydraulic selector valve configured to be opened, by input of a pilot pressure to the hydraulic selector valve, at an opening degree corresponding to a magnitude of the pilot pressure, wherein the work operation part is configured to output a pilot pressure to be input to each of the first work actuator control valve and the second work actuator control valve as the work command, wherein the work command adjuster is a pilot pressure limitation valve which is operated, by input of a pilot pressure limitation command, to limit the pilot pressure that is output from the work operation part, so as to reduce the opening degree of the second work actuator control valve in accordance with the pilot pressure limitation command, wherein the adjustment command part is configured to generate the pilot pressure limitation command as the work adjustment command and to input the pilot pressure limitation command to the pilot pressure limiting valve, and wherein the pilot pressure limitation command generated by the adjustment command part for the synchronization control is a command for rendering a limitation of the pilot pressure by the pilot pressure limiting valve smaller than a limitation of the pilot pressure according to the pilot pressure limitation command for the asynchronization control.

3. The work machine according to claim 1, wherein the work attachment includes a boom attached to the upper turning body so as to be raisable and lowerable; the work actuator is a boom cylinder expandable and contractable so as to move the boom rotationally vertically to the upper turning body; and wherein the specific work motion that the work actuator causes the work attachment to make is a boom rising motion in which the boom is moved rotationally upward to the upper turning body.

4. The work machine according to claim 1, wherein the controller further includes a turning deceleration operation judgment part that judges whether or not the turning operation applied to the turning operation part is the turning deceleration operation, and wherein the adjustment command part performs the synchronization control only when the turning deceleration operation judgment part judges that the turning operation is the turning deceleration operation in the combination operation state.

5. The work machine according to claim 4, wherein the turning deceleration operation judgment part is configured to judge that the turning deceleration operation is being performed when a turning operation amount, which is a magnitude of the turning operation, is shifted from a state where the turning operation amount is larger than a deceleration threshold which is a threshold set for the turning operation amount to a state where the turning operation amount is smaller than the deceleration threshold.

* * * * *